(12) United States Patent
Spielberg

(10) Patent No.: US 9,237,275 B2
(45) Date of Patent: Jan. 12, 2016

(54) FLASH PHOTOGRAPHY

(71) Applicant: International Business Machines Corporation, Armonk, NY (US)

(72) Inventor: Anthony C. Spielberg, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/136,492

(22) Filed: Dec. 20, 2013

(65) Prior Publication Data

US 2015/0181097 A1    Jun. 25, 2015

(51) Int. Cl.
*H04N 5/235* (2006.01)
*G03B 15/05* (2006.01)

(52) U.S. Cl.
CPC .............. *H04N 5/2353* (2013.01); *G03B 15/05* (2013.01); *H04N 5/2354* (2013.01)

(58) Field of Classification Search
CPC . H04N 5/2352; H04N 5/2353; H04N 5/2354; H04N 5/2356; G03B 15/02–15/07
See application file for complete search history.

(56) References Cited

U.S. PATENT DOCUMENTS

| | | | | |
|---|---|---|---|---|
| 5,453,812 | A * | 9/1995 | Terada et al. | 396/176 |
| 5,614,970 | A * | 3/1997 | Takagi et al. | 396/164 |
| 7,920,205 | B2 * | 4/2011 | Awazu | 348/371 |
| 2002/0105631 | A1 | 8/2002 | Nonaka et al. | |
| 2007/0024742 | A1 | 2/2007 | Raskar et al. | |
| 2007/0025720 | A1 | 2/2007 | Raskar et al. | |
| 2007/0121072 | A1 * | 5/2007 | Misawa et al. | 352/38 |
| 2010/0157135 | A1 | 6/2010 | Dossaji et al. | |
| 2010/0254692 | A1 | 10/2010 | Kurt et al. | |
| 2012/0069240 | A1 * | 3/2012 | Osawa | 348/371 |
| 2012/0249864 | A1 * | 10/2012 | Robinson et al. | 348/371 |
| 2013/0057740 | A1 * | 3/2013 | Takaiwa | 348/297 |
| 2013/0064531 | A1 * | 3/2013 | Pillman et al. | 396/62 |
| 2013/0222643 | A1 † | 8/2013 | Tseng | |
| 2014/0063287 | A1 * | 3/2014 | Yamada | 348/229.1 |
| 2014/0340572 | A1 * | 11/2014 | Sato et al. | 348/370 |
| 2014/0368729 | A1 † | 12/2014 | Takai | |

FOREIGN PATENT DOCUMENTS

EP    1720342    11/2006

OTHER PUBLICATIONS

Capata et al., Flash Defect Eyes Correction in Images With Auto-Focus Failure, 2011 10th International Symposium on Signals, Circuits and Systems (ISSCS), 2011.

\* cited by examiner
† cited by third party

*Primary Examiner* — Jason Flohre
(74) *Attorney, Agent, or Firm* — Lieberman & Brandsdorfer, LLC

(57) ABSTRACT

Embodiments of the invention relates to cameras and flash photography, and to modulating intensity of light over time and space to subjects in an associated composition. As the composition of a photograph is created, subjects in the composition are metered and flash illumination is determined. A mask is created from an array of filters. The mask is a pattern of opacity of the filters, with the pattern modulating output of the flash. The mask pattern is applied to an associated flash head so that an exposure of the composition is made with the masked flash. Exposure of the subjects in the composition is balanced through a selective illumination of the subjects by the varied intensity created through the mask.

22 Claims, 9 Drawing Sheets

FLASH PHOTOGRAPHY

BACKGROUND

This invention relates to cameras and flash photography. More specifically, the invention relates to modulating intensity of light over time and space to subjects in an associated composition.

Flash units are often used in photography to acquire an image of a scene under low-light conditions. It is known that flash units produce a variety of undesirable effects and artifacts. Specifically, intensity of light emitted by the flash unit decreases based on the distance from the camera. Objects in an associated composition that are close to the flash unit tend to be over exposed, while objects that are more distant from the flash unit tend to be underexposed.

BRIEF SUMMARY

The invention comprises a method, computer program product, and system for actively modifying modulation output of light from a camera flash unit.

A method, computer program product, and system are provided for varying flash intensity across an exposure frame. A photograph is composed, with the composition including metering composition subjects and determining flash illumination required for the composition subjects. A mask for application of the metered composition is created from an array of filters. The creation of the mask includes calculating a pattern of the filters for modulating output of an electronic flash. The created mask pattern is applied to a flash head and an exposure of the composition is made with the masked flash. The exposure includes a balance of multiple subjects in the composition through the varying flash intensity across the exposure frame.

Other features and advantages of this invention will become apparent from the following detailed description of the presently preferred embodiment(s) of the invention, taken in conjunction with the accompanying drawings.

BRIEF DESCRIPTION OF THE SEVERAL VIEWS OF THE DRAWINGS

The drawings referenced herein form a part of the specification. Features shown in the drawings are meant as illustrative of only some embodiments of the invention, and not of all embodiments of the invention unless otherwise explicitly indicated.

DETAILED DESCRIPTION

It will be readily understood that the components of the present invention, as generally described and illustrated in the Figures herein, may be arranged and designed in a wide variety of different configurations. Thus, the following detailed description of the embodiments of the apparatus, system, and method of the present invention, as presented in the Figures, is not intended to limit the scope of the invention, as claimed, but is merely representative of selected embodiments of the invention.

Reference throughout this specification to "a select embodiment," "one embodiment," or "an embodiment" means that a particular feature, structure, or characteristic described in connection with the embodiment is included in at least one embodiment of the present invention. Thus, appearances of the phrases "a select embodiment," "in one embodiment," or "in an embodiment" in various places throughout this specification are not necessarily referring to the same embodiment.

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

Photographs taken of a single subject or scenery often include a foreground and a background. Similarly, photographs taken of multiple subjects often include an extra dimension of at least a second subject in the scenery. Flash units are known to be used in photography to emit light so that the subject(s) in the associated composition are illuminated during capture. Reference is made to an active modifier to vary light transmission across multiple subjects in a photograph to provide balance across the composition. The active modifier is a hardware unit in the form of a panel that is provided in communication with the flash unit. The hardware unit includes multiple variable transparency filter elements, herein after referred to as filters that comprise the unit, each of the filters being separately addressable. Light from the flash unit is varied by separately adjusting the transparency of each of the filters in the hardware unit. Accordingly, the panel serves as a hardware unit that changes intensity of light emitted by the flash unit through modulation of the individual filters. The pattern of modulation of light intensity created by the filters is transferred to the scene being photographed; this is possible because the light leaving the flash head is collimated or focused to some extent.

Figure 1:
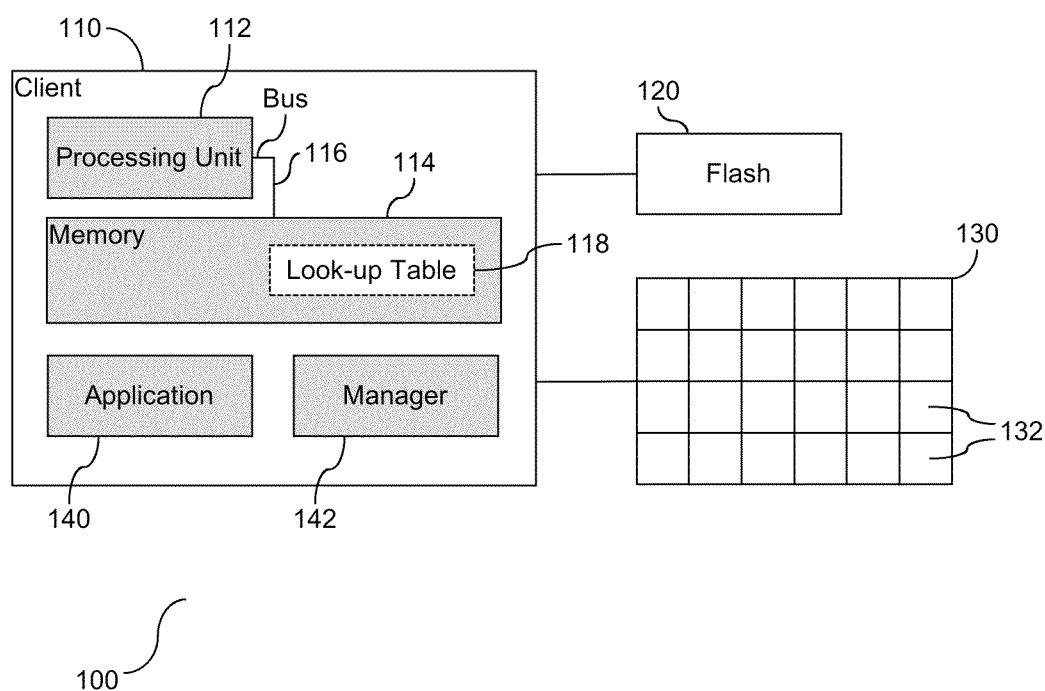
FIG. 1 depicts a block diagram illustrating tools to support functionality of the hardware unit, and specifically modulation of the filters to change light intensity emitted from a flash unit in communication with the hardware unit.

Referring to FIG. 1, a block diagram (100) is provided illustrating tools to support functionality of the hardware unit, and specifically modulation of the filters to alter the light intensity emitted from a flash unit in communication with the hardware unit. As shown, a camera (110) is provided with an embedded processing unit (112) operatively coupled to memory (114) across a bus (116). A flash unit (120) is provided in communication with the camera (110) and functions to illuminate composition of a photograph. The flash unit (120) functions upon receipt of power, and in response to activation of the camera (110). An active modifier (130) is provided in communication with the camera (110) and the flash unit (120). The modifier (130) may function to be physically placed over the flash unit (120) as an external flash attachment, or in one embodiment, may be internally configured with the flash unit (120). Regardless of the internal or external placement, the modifier (130) functions to modulate light emitted from the flash unit (120).

As shown herein, the modifier (130) is comprised of a plurality of filters (132). In one embodiment, the filters are arranged in a matrix extending over rows and columns arranged on a planar platform, i.e. horizontal and vertical axis. The filters (132) are individually addressed, and may be separately and independently adjusted to control the amount of light received from the flash unit (120). An application (140) is provided in communication with the processing unit (112) and functions to communicate with the modifier (130), and specifically with modulation of the separate filters (132). Prior to taking the photograph, a composition of the photograph is gathered by a manager (142) to read the scene for the photograph and to determine an exposure pattern for the photograph. The manager (142) functions to analyze the scene and to make a determination of output of light from the flash unit (120) required to expose the scene properly. The manager (142) communicates any light pattern adjustments to the application (140), and specifically whether any of the filters in the modifier (130) need to be modulated.

As described above, the filters (132) of the modifier (130) are arranged in an array and function to control emission of light from the flash unit (120). In one embodiment, each filter in the array may be variable between two positions, on and off, and in another embodiment, each filter in the array may be continuously variable in opacity. Different states of opacity enable different intensities of light from the flash unit (120) to transmit through the filters (132). The application (140) receives light information from the manager (142) and functions to address the separate filters of the modifier (130) to create a pattern.

The application (140) and the manager (142) are shown residing local to the camera (110). In one embodiment, the application (140) and the manager (142) may reside as one or more applications in memory (114) or as one or more hardware tools external to the memory (114). In another embodiment, the application (140) and the manager (142) may be implemented as a combination of hardware and software. Similarly, in the case of an embodiment with a pool of shared resources, such as a cloud computing environment, the application (140) and the manager (142) may be collectively or individually distributed across the shared pool of resources and function as a unit to communication with the camera (110) to support creation of a gradient. Accordingly, the application (140) and the manager (142) may be implemented as one or more software tools, hardware tools, or a combination of software and hardware.

Figure 2:
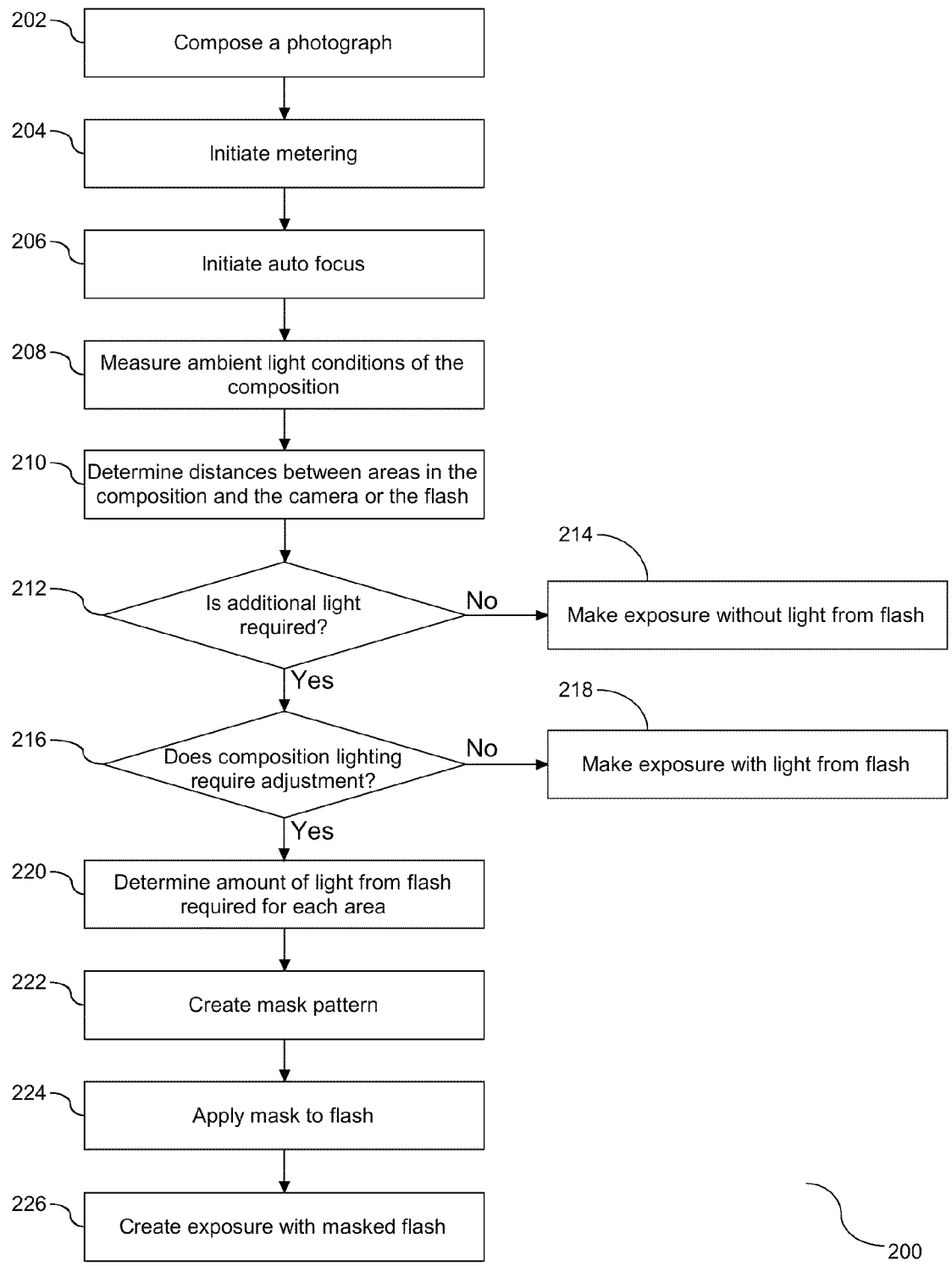
FIG. 2 depicts a flow chart illustrating one aspect of the functionality of the modifier.

To further illustrate and as shown herein, FIG. 2 is a flow chart (200) illustrating one aspect of the functionality of the modifier. As explained above, the modifier is an array of filters which are set to modify light transmission from an associated light emitting device, such as a flash unit. The process of employing the modifier originates with composing a photograph (202). Metering is initiated (204) to determine quantity of light reaching a photographic film as determined by shutter speed and lens aperture of the camera. In digital photography, film is replaced by sensor. In one embodiment, autofocus is also initiated (206). Autofocus is a function of the camera/lens system that determines the distance between the camera and a subject, thus enabling the camera/lens system to focus automatically. As described above in FIG. 1, light may naturally be present in the composition, or in one embodiment may be provided from a flash unit. To support an adjustment of the light, ambient light conditions of the composition are measured (208). In one embodiment, a light meter is provided or embedded with the camera unit to measure the ambient light. In addition to the measurement at step (208), distance between a subject and the camera, or between the subject and the flash unit, are also determined (210). The distance determinations may address a plurality of locations within of the composition, which may include a plurality of subjects, and a plurality of other areas of the composition, e.g., non-subject foreground areas, and non-subject background areas.

Following steps (208) and (210), it is determined if additional light is required for the composition (212). A negative determination to the response at step (212) is followed by making an exposure without light from a flash unit (214). However, a positive response to the determination at step (212) is following by determining the amount of light from flash illumination required for each area in the composition (216). In one embodiment, different areas of the composition may require different quantities of flash illumination. For example, the background may require more flash illumination than the foreground, or in one embodiment, different subjects within the foreground and background may require different quantities of flash illumination separate from the background or foreground. A mask pattern is created for the flash head based on the determined flash illumination (212), and the mask pattern is applied to the flash head (220). In one embodiment, creating the mask includes, collecting distance information for the composition subjects and combining the collected information with yaw, pitch, and roll data to accommodate subsequent rotation of the camera before exposure. Following the application at step (220), an exposure of the composition is made with the masked flash (222). Accordingly, a photograph is composed and a mask pattern is created and applied for the specific composition.

Figure 3A:
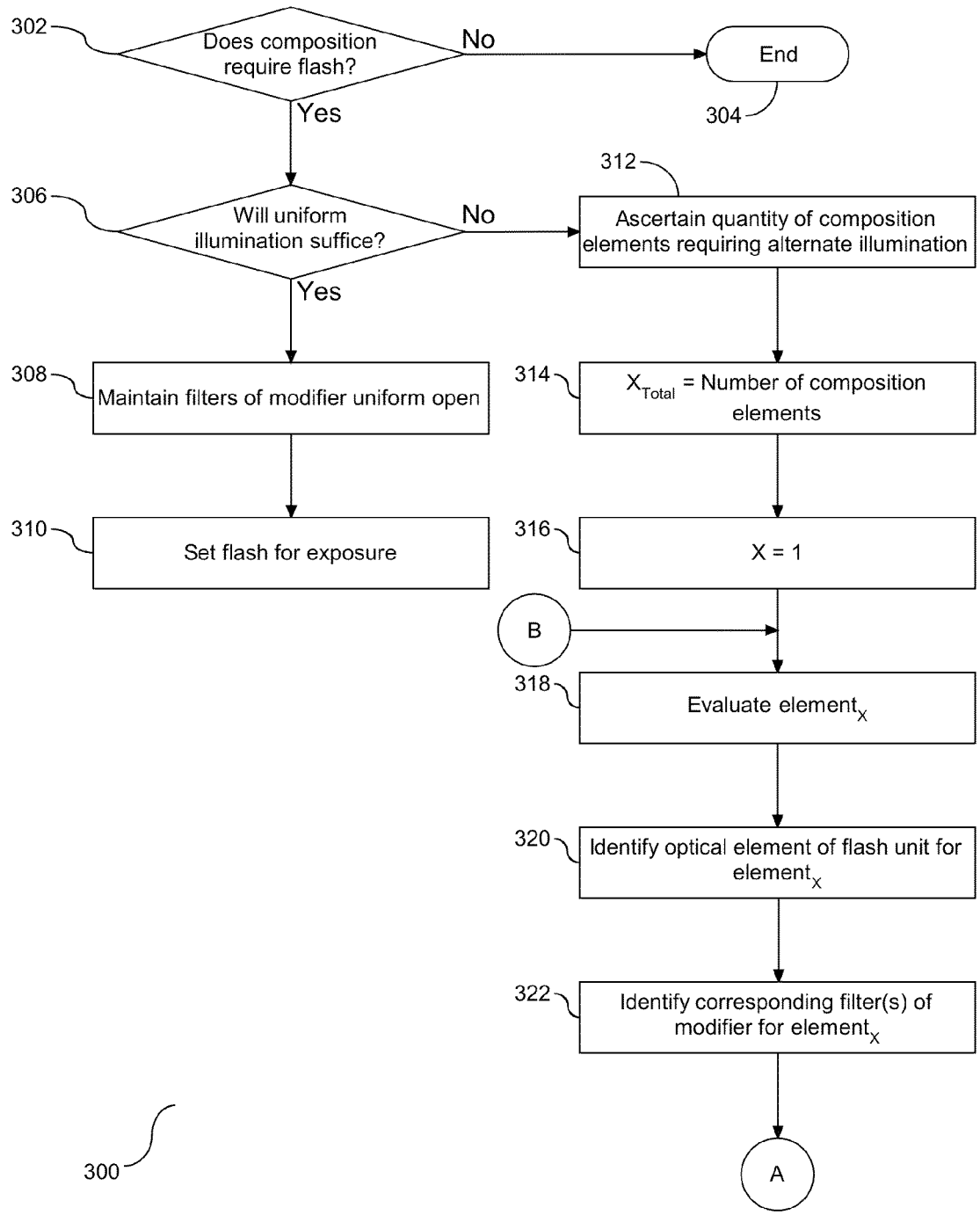
FIGS. 3A and 3B depict a flow chart illustrating a series of operations to determine a gradient for the composition.
Figure 3B:
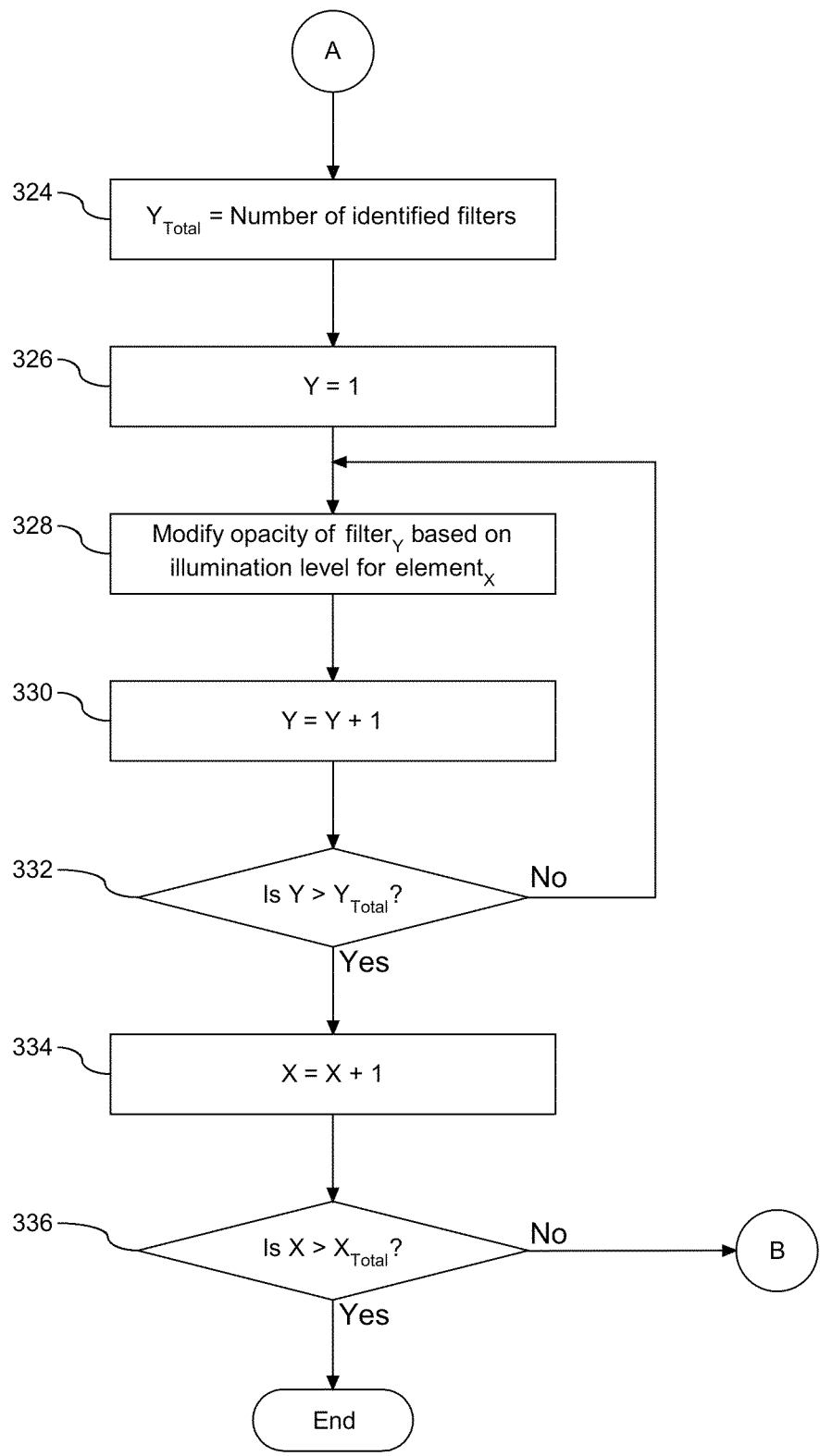

As implied in FIG. 2, the scene of the composition is read and evaluated to ascertain proper lighting to the foreground, background, and any subjects therein. FIGS. 3A and 3B are a flow chart (300) illustrating a series of operations to determine a gradient for the composition. Initially, it is determined if the composition requires illumination from a flash unit (302). A negative response to the determination at step (302) concludes the gradient creation (304). However, a positive response to the determination (302) is followed by determining if a uniform application of light from the flash unit will suffice for the required illumination (306). A positive response to the determination step (306) is followed by maintaining the filters of the modifier uniformly open (308) and setting the flash unit for the exposure (310). However, a negative response to the determination at step (308) is followed by ascertaining the quantity of elements of the composition that require alternate or different levels of illumination (312) and assigning this quantity to the variable $X_{Total}$ (314). Accordingly, a plurality of elements in a composition may be identified for illumination adjustment for non-uniform application of light to the composition.

Following step (314), a counting variable X for each of the elements of the composition is initialized (316). Element$_X$ in the composition is evaluated, and specifically the intensity of light required to properly illuminate element$_X$ to provide contextual replication in the composition is evaluated (318). The optical elements of the flash unit that are subject to illuminate element$_X$ are identified (320), and one or more filters of the modifier corresponding to the identified optical elements are also identified (322). Each of the filters is continuously variable in opacity. In addition, each of the filters is independently addressable. The variable $Y_{Total}$ is assigned to the quantity of filters identified for element$_X$ (324), and an associated filters counting variable Y is initialized (326). Thereafter, the opacity of filter$_Y$ is modified based on the illumination level for element$_X$ and the corresponding illumination to be emitted from the flash unit (328). In one embodiment, each filter is an optical element that has an independently variable transparency. Accordingly, the filters are separately modified to control projection of light there through.

Following the opacity modification at step (328), the filter counting variable, Y, is incremented (330), and it is determined if the opacity of all of the filters for element$_X$ have been evaluated and/or modified (332). In one embodiment, one or more individual filters may not require any opacity modification. A negative response to the determination at step (332) is followed by a return to step (328). Conversely, a positive response to the determination at step (332) is followed by an increment of the element counting variable (334). After the increment at step (334), or is determined if all of the identified elements in the composition have been evaluated (336). A negative response to the determination at step (336) is followed by a return to step (318), and a positive response to the determination at step (336) concludes the filter opacity modification. In one embodiment, the opacity of the filters are only variable between its respective maximum and minimum, e.g. open or closed, and may be varied between these two states over time during the flash exposure. Accordingly, as shown herein, each filter in the modifier is associated with the flash unit and the composition so that the opacity of the filters may be independently modified.

Figure 4:
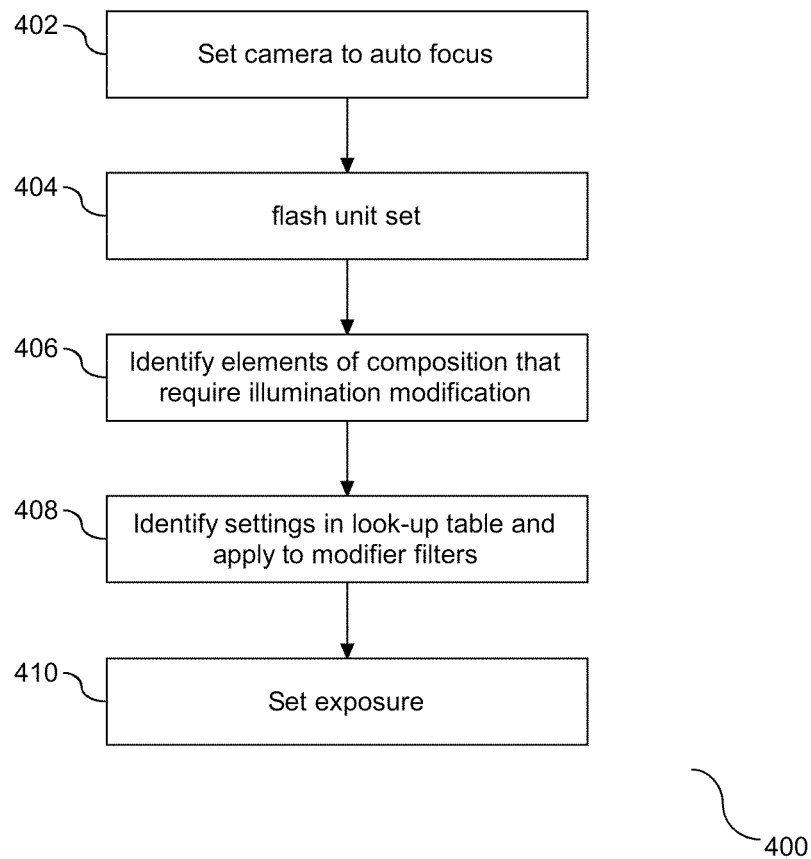
FIG. 4 depicts a flow chart illustrating a demonstration of functionality of the filters with the composition.

The opacity modification shown and described in FIGS. 3A and 3B illustrates a series of operations that determine and create a light pattern for a composition. In one embodiment, the filters and independently addressable, and computer implemented instructions are employed to communicate with the filters and to set and maintain their opacity. Cameras are provided with different modes of operation. As shown in FIGS. 3A and 3B, a configurable mode enables all aspects of the composition to be manually adjusted so that light is properly distributed across the identified composition elements. Referring to FIG. 4, a flow chart (400) is provided to demonstrate functionality of the filters with the composition. As shown, the camera is set to operate in an autofocus mode (402). In one embodiment, the camera is provided with an autofocus mode of operation (402). As in FIGS. 3A and 3B, a flash unit for the composition may be required (404), as determined by the autofocus mode. Thereafter, the elements of the composition that require modification to the illumination are identified (406). A look-up table is consulted to ascertain the modification required for the separate elements, and specifically the filters in the adjacent modifier. The setting(s) as identified in the look-up table are applied to each of the associated modifier filters (408), and the exposure is set (410). Accordingly, in the autofocus mode of operation, the filters are independently modified through a series of computer implemented instructions as directed though an associated table.

The opacity settings of the modifier filters modulates intensity of light emitted by the adjacent flash unit. More specifically, the use of the modifier as described herein changes the intensity of the light over both time, and over space, where space is a plane perpendicular to a line running between the flash and the center of the composition. An appropriate pattern needed to modulate the output of the flash unit is calculated and produces a selected illumination of subjects in the composition at varying distances from the camera lens.

Figure 5:
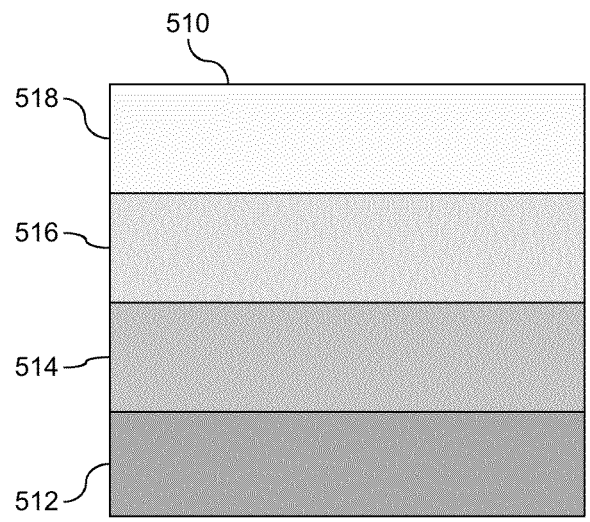
FIG. 5 depicts a block diagram of application of a gradient mask to a composition.
Figure 5:
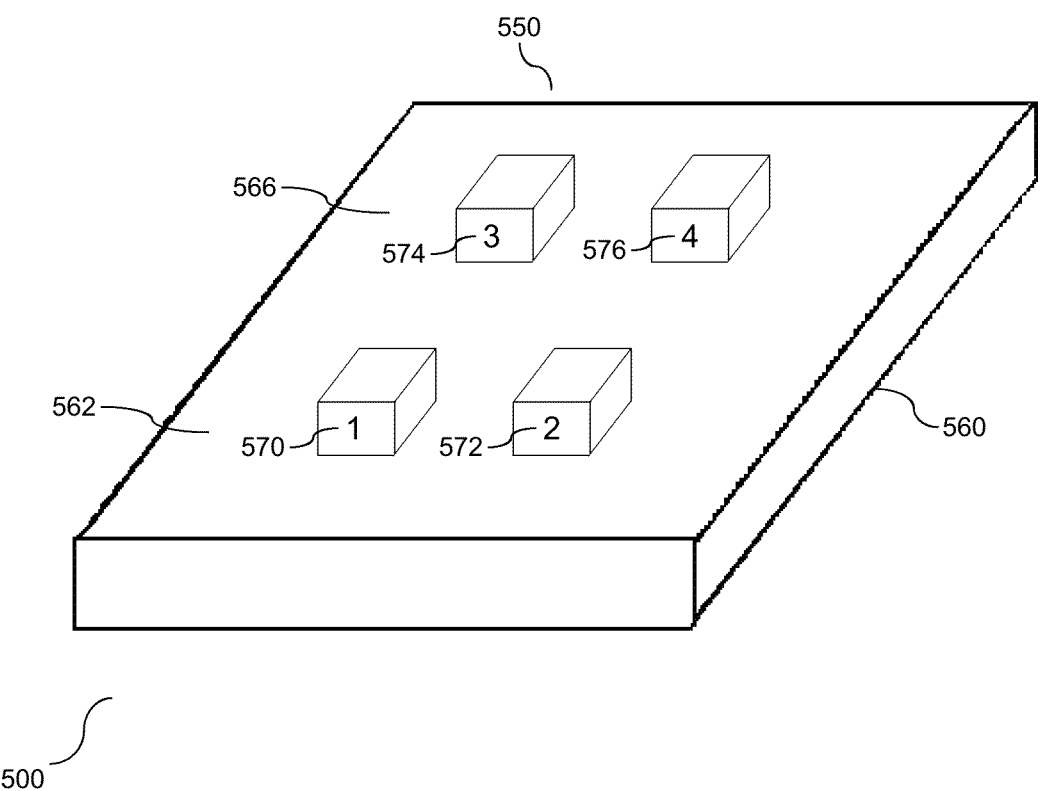

Referring to FIG. 5, a block diagram (500) of application of a pattern mask (510) to a composition (550) is provided. As shown, the composition is represented in a region (560), having a foreground (562) and a background (566), and a plurality of objects (570), (572), (574) and (576) in the composition. The foreground (562) pertains to an area of the composition that is closer to the camera unit and an associated flash unit, and the background (566) pertains to an area of the composition that is further away from the camera unit and the associated flash. Objects (570) and (572) are located in the foreground (562), and objects (574) and (576) are located in the background (566). Objects in the foreground are generally exposed to more light from the flash unit when compared to objects in the background that receive less light. The quantity and position of the objects is for descriptive purposes and should not be considered limiting.

To accommodate light distribution from the flash in accordance with the description provided in FIGS. 1-4, the mask creates a pattern for the exposure frame, and in one embodiment minimizes the differences in illumination among subjects of varying distances from the flash unit. An exposure frame refers to the two-dimensional limits of a photographic composition. The exposure frame may be previewed before an exposure is made using the viewfinder of a camera, on an electronic display, or on other visual display devices. The exposure frame is determined at the time of exposure. As shown at (510), the pattern mask shows four regions (512), (514), (516), and (518), which together form a gradient along one axis. In one embodiment, the pattern mask may include additional regions or fewer regions, which may vary in opacity along one axis or along two orthogonal axes, and the quantity of regions shown herein should not be considered limiting. The regions identified in the mask are applied to the flash head and thus affect the amount of flash light which will illuminate the objects represented therein. More specifically, the regions are depicted as darker in those areas of the exposure frame corresponding to the foreground, and lighter in those regions of the exposure frame corresponding to the background, e.g. (512) is the darkest region with the regions (514), (516), and (518) becoming progressively lighter. Accordingly, when the pattern mask (510) is applied to the composition (550), illumination of the objects is balanced.

Referring to FIGS. 6-9, a set of graphs are provided to further illustrating the functionality of the modifier filters. In FIGS. 6-9, the flash unit is assumed to be a conventional photographic flash, wherein the intensity of the flash illumination cannot be set to intermediate values less than the full output of the flash. Such conventional flash units can be set only to full output, or be set to be entirely off. Total flash exposure is controlled by the amount of time the flash is kept in its "on" state. In FIGS. 6-9, "flash intensity" refers to the intensity of light emitted by the flash unit in its "on" state, before that light is modified by the filters (132). "Modified flash intensity" refers to the intensity of light after it has been modified by the filters (132). In FIGS. 6-9, modified flash intensity is represented on the vertical axis (610) and time is represented on the horizontal axis (620). The curves shown in these figures illustrate various schemes by which the filters (132) may be used to control the modified flash intensity for a given location in the modifier, and thus control the flash exposure for a corresponding region in the photographic composition. The total amount of light leaving the modifier at that location, which is equivalent to the contribution to total flash exposure being contributed by that location, will be determined by the integral under the curve, i.e., the integration of modified flash intensity over time.

Figure 6:
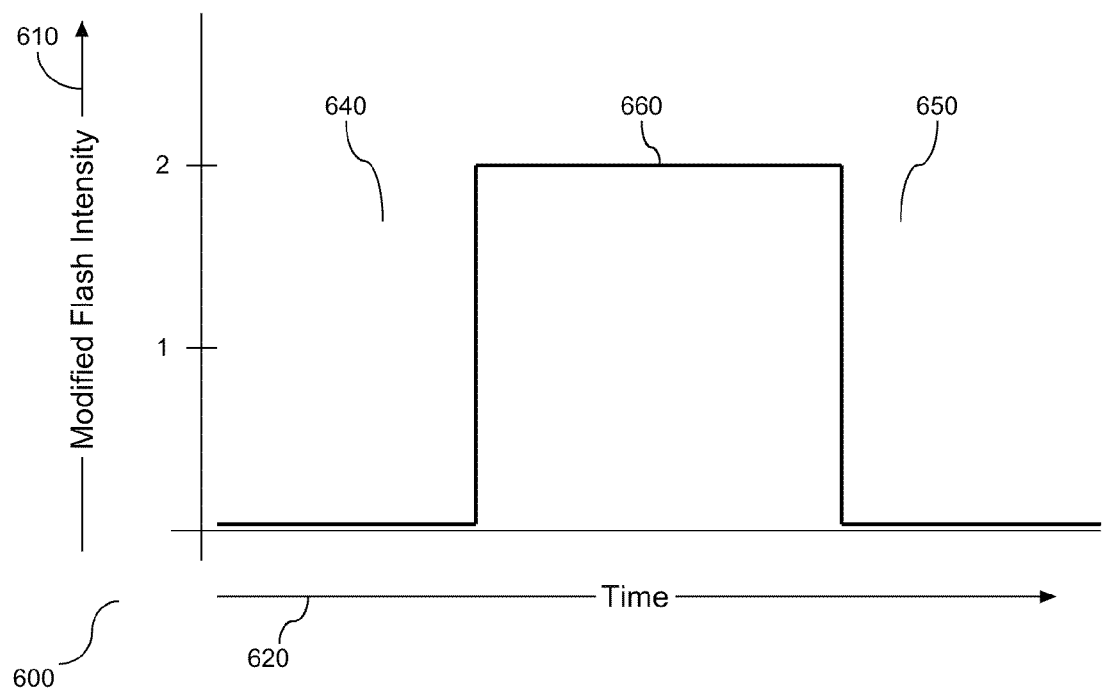
FIG. 6 depicts a graph illustrating the relationship between flash intensity and time with respect to the modifier and associated filters.

FIG. 6 is a graph (600) illustrating one embodiment of the relationship between modified flash intensity and time for individual filters. In the example represented herein, the individual filters of the modifier have one of two settings, ON and OFF. In the example shown herein, the filter elements are set to OFF during the time intervals identified at (640) and (650), and the filter elements are set to ON during the time interval identified at (660).

Figure 7:
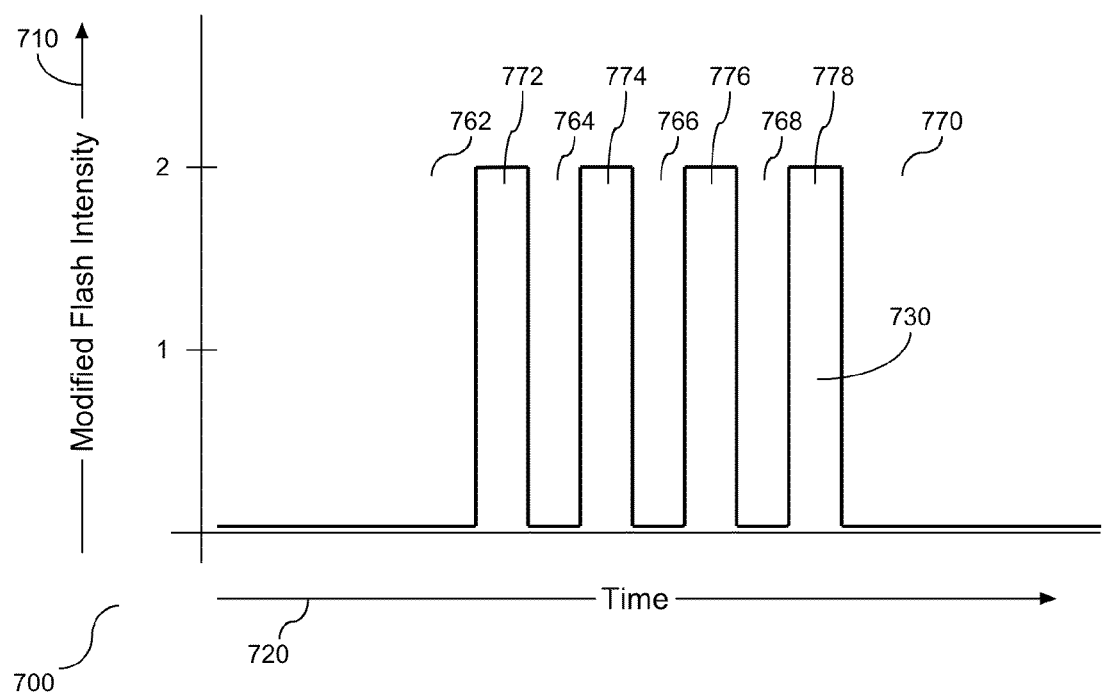
FIG. 7 depicts a graph illustrating the addressable functionality of the modifier filters.

Referring to FIG. 7, a graph (700) is provided illustrating the addressable functionality of the modifier filters. As shown, modified flash intensity is represented on the vertical axis (710) and time is represented on the horizontal axis (720). In the example represented herein, the individual filters of the modifier have one of two settings, ON and OFF. The area (730) under the curve represents exposure to light provided by the flash unit as determined by the integral of the curve function. In the example shown herein, the intensity of the light emitted from the flash is uniform, and in one embodiment the intensity and duration is the same as that shown in FIG. 6. In the example shown herein, the filter elements vary between ON and OFF during the period of exposure. Specifically, the filters are set to OFF during the intervals identified at (762), (764), (766), (768), and (770), and remain OFF thereafter. The filter elements are set to ON during the intervals identified at (772), (774), (776), and (778). As shown, the light intensity of the exposure is reduced in comparison to that shown in FIG. 6. Specifically, the ON and OFF settings of the filters are controlled with a 50% duty cycle, e.g. 50% exposure compared to the exposure shown in FIG. 6. Accordingly, in the example shown herein the flash intensity is controlled by addressing the modifier filters and turning the filters ON and OFF during the exposure.

Figure 8:
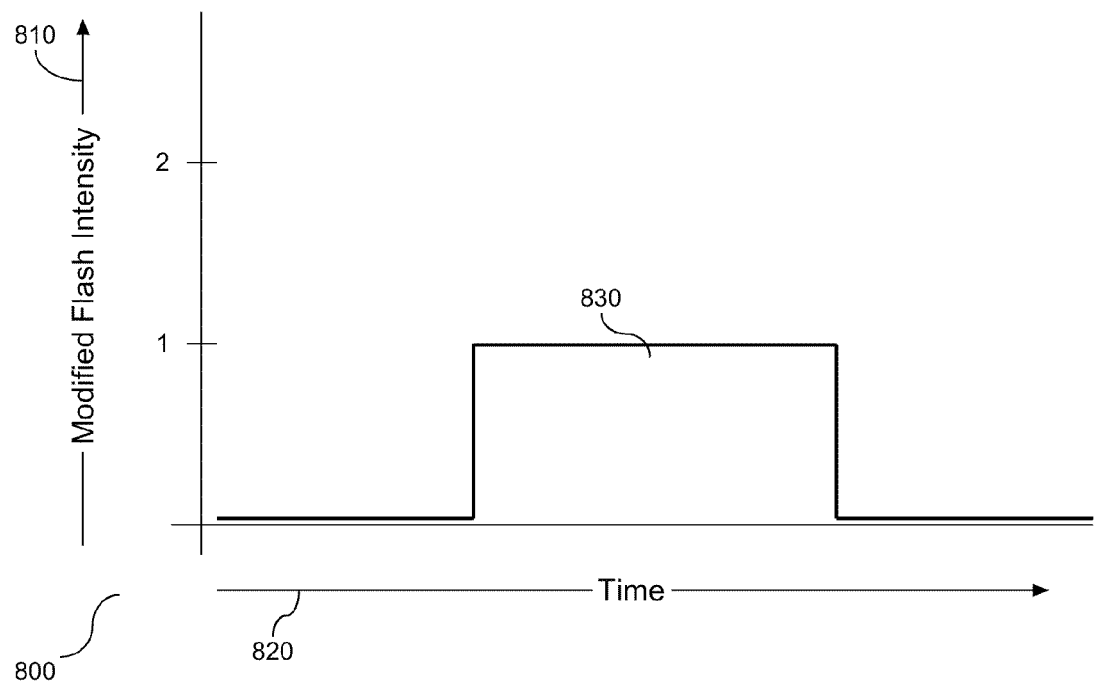
FIG. 8 depicts a graph illustrating the addressable filters each having a modifiable opacity.

As described in FIGS. 3A and 3B, the opacity of the individual filters may be modified. FIG. 8 is a graph (800) illustrating the addressable filters each having a modifiable opacity. As shown, flash intensity is represented on the vertical axis (810) and time is represented on the horizontal axis (820). In the example represented herein, the individual filters of the modifier have modifiable opacity, including variations of opacity between the two extreme positions of ON and OFF. The area (830) under the curve represents exposure to light provided by the flash unit as determined by the integral of the curve function. In the example shown herein, the opacity of the individual filters of the modifier are set to a value of opacity between ON and OFF. Furthermore, as shown herein, intensity of the light emitted from the flash is uniform, and in one embodiment the modified flash intensity is about 50% of the intensity shown in FIGS. 6 and 7, and duration is the same as that shown in FIGS. 6 and 7. In the example shown herein, the opacity is at an intermediate value and is constant. In one embodiment, the opacity levels can be continuously set, e.g. vary opacity. Accordingly, in the example shown herein the flash intensity is controlled by addressing the modifier filters and varying the opacity setting of the individual filters during the exposure.

Figure 9:
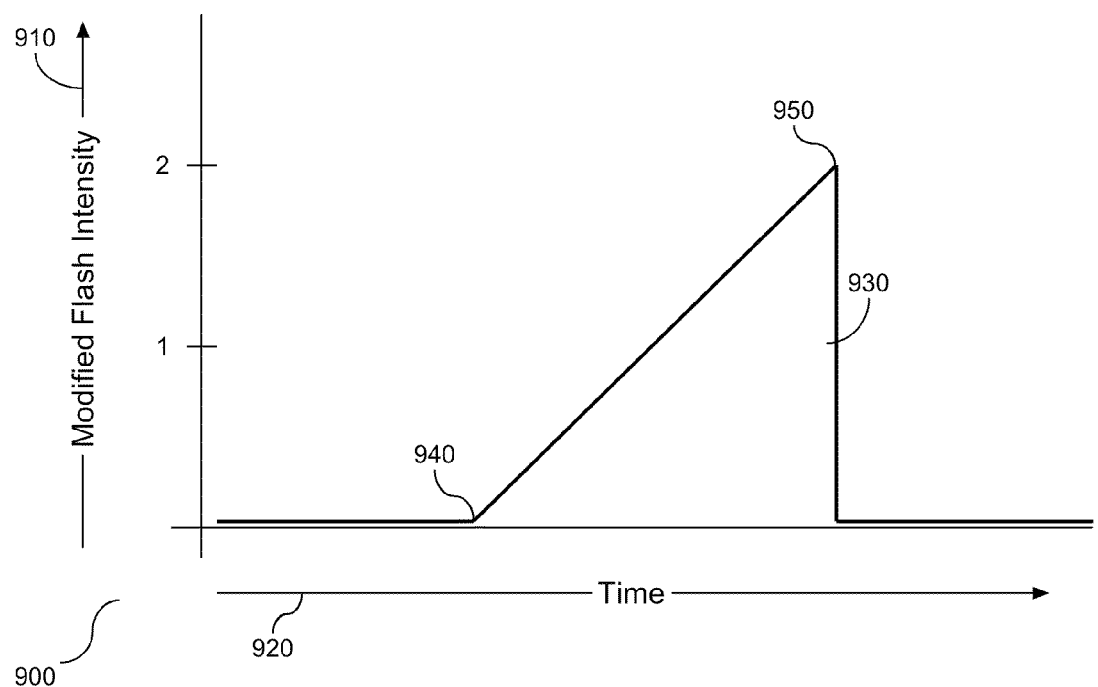
FIG. 9 depicts a graph illustrating the aspect of varying opacity of the individual filters over the length of the exposure.

Referring to FIG. 9, a graph (900) is provided illustrating the aspect of varying opacity of the individual filters over the length of the exposure. As shown, modified flash intensity is represented on the vertical axis (910) and time is represented on the horizontal axis (920). In the example represented herein, the individual filters of the modifier have modifiable opacity, including variations of opacity between the two extreme positions of ON and OFF. The area (930) under the curve represents exposure to light provided by the flash unit as determined by the integral of the curve function. In the example shown herein, the opacity of the individual filters of the modifier are set to opacity between ON and OFF. In the example shown herein, the opacity is initially at a minimum position (940) and increases at a linear rate over time to a maximum position (950). The time from the minimum position at (940) to the maximum position at (950) represents the course of the exposure. Accordingly, as shown herein the opacity levels of the filters are to be continuously changed over time to enable flash intensity to be controlled by addressing the modifier filters and varying the opacity setting of the individual filters during the exposure.

The camera described above in FIG. 1 has been labeled with tools in the form of a modifier and an application. The tools may be implemented in programmable hardware devices such as field programmable gate arrays, programmable array logic, programmable logic devices, or the like. The tools may also be implemented in software for execution by various types of processors. An identified functional unit of executable code may, for instance, comprise one or more physical or logical blocks of computer instructions which may, for instance, be organized as an object, procedure, function, or other construct. Nevertheless, the executable of the tools need not be physically located together, but may comprise disparate instructions stored in different locations which, when joined logically together, comprise the tools and achieve the stated purpose of the tool.

Indeed, executable code could be a single instruction, or many instructions, and may even be distributed over several different code segments, among different applications, and across several memory devices. Similarly, operational data may be identified and illustrated herein within the tool, and may be embodied in any suitable form and organized within any suitable type of data structure. The operational data may be collected as a single data set, or may be distributed over different locations including over different storage devices, and may exist, at least partially, as electronic signals on a system or network.

Furthermore, the described features, structures, or characteristics may be combined in any suitable manner in one or more embodiments. In the following description, numerous specific details are provided, such as examples of agents, to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Figure 10:
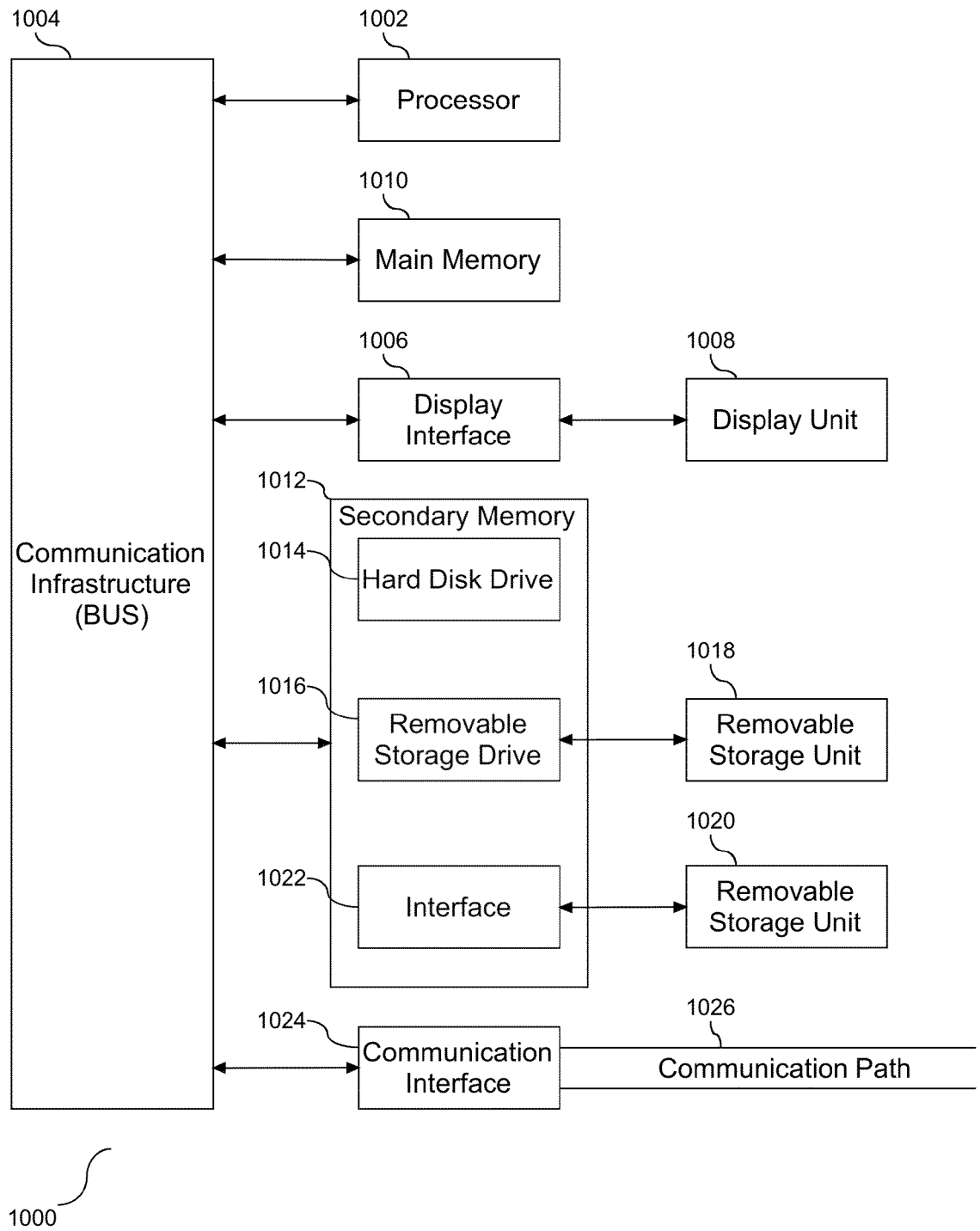
FIG. 10 depicts a block diagram of a computing environment according to an embodiment of the present invention.

Referring now to the block diagram of FIG. 10, additional details are now described with respect to implementing an embodiment of the present invention. The computer system includes one or more processors, such as a processor (1002). The processor (1002) is connected to a communication infrastructure (1004) (e.g., a communications bus, cross-over bar, or network).

The computer system can include a display interface (1006) that forwards graphics, text, and other data from the communication infrastructure (1004) (or from a frame buffer not shown) for display on a display unit (1008). The computer system also includes a main memory (1010), preferably random access memory (RAM), and may also include a secondary memory (1012). The secondary memory (1012) may include, for example, a hard disk drive (1014) and/or a removable storage drive (1016), representing, for example, a floppy disk drive, a magnetic tape drive, or an optical disk drive. The removable storage drive (1016) reads from and/or writes to a removable storage unit (1018) in a manner well known to those having ordinary skill in the art. Removable storage unit (1018) represents, for example, a floppy disk, a compact disc, a magnetic tape, or an optical disk, etc., which is read by and written to by removable storage drive (1016). As will be appreciated, the removable storage unit (1018) includes a computer readable medium having stored therein computer software and/or data.

In alternative embodiments, the secondary memory (1012) may include other similar means for allowing computer programs or other instructions to be loaded into the computer system. Such means may include, for example, a removable storage unit (1020) and an interface (1022). Examples of such means may include a program package and package interface (such as that found in video game devices), a removable memory chip (such as an EPROM, or PROM) and associated socket, and other removable storage units (1020) and interfaces (1022) which allow software and data to be transferred from the removable storage unit (1020) to the computer system.

The computer system may also include a communications interface (1024). Communications interface (1024) allows software and data to be transferred between the computer system and external devices. Examples of communications interface (1024) may include a modem, a network interface (such as an Ethernet card), a communications port, or a PCM-CIA slot and card, etc. Software and data transferred via communications interface (1024) is in the form of signals which may be, for example, electronic, electromagnetic, optical, or other signals capable of being received by communications interface (1024). These signals are provided to communications interface (1024) via a communications path (i.e., channel) (1026). This communications path (1026) carries signals and may be implemented using wire or cable, fiber optics, a phone line, a cellular phone link, a radio frequency (RF) link, and/or other communication channels.

In this document, the terms "computer program medium," "computer usable medium," and "computer readable medium" are used to generally refer to media such as main memory (1010) and secondary memory (1012), removable storage drive (1016), and a hard disk installed in hard disk drive (1014).

Computer programs (also called computer control logic) are stored in main memory (1010) and/or secondary memory (1012). Computer programs may also be received via a communication interface (1024). Such computer programs, when run, enable the computer system to perform the features of the present invention as discussed herein. In particular, the computer programs, when run, enable the processor (1002) to perform the features of the computer system. Accordingly, such computer programs represent controllers of the computer system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block(s).

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated. Accordingly, the addressable aspect of the filters enables customization of illumination across a composition, including creating a unique gradient for separation compositions.

Alternative Embodiment

It will be appreciated that, although specific embodiments of the invention have been described herein for purposes of illustration, various modifications may be made without departing from the spirit and scope of the invention. In particular, modification of the separate filters creates a unique gradient to the composition which may be applied to a single composition. Similarly, in one embodiment, the gradient is created from a combination of all of the filter settings of the modifier, which may be saved in the look-up table for application in the future. Accordingly, the scope of protection of this invention is limited only by the following claims and their equivalents.

I claim:

1. A method comprising:
    composing a photograph, including metering composition subjects and determining flash illumination required for the composition subjects;
    creating a mask pattern from an array of filters for application of the metered composition, including collecting distance information for the composition subjects and combining the collected information with orientation data, and calculating a pattern of the filters for modulating output of an electronic flash;
    applying the created mask pattern to a head of the flash; and
    making an exposure of the composition with the masked head.

2. The method of claim 1, further comprising balancing exposure of multiple subjects in the composition by selectively illuminating the subjects in the composition by varying light intensity across an exposure frame.

3. The method of claim 1, wherein application of the mask pattern to the head includes varying opacity of the filters in a continuous fashion between their minimum and maximum opacities, and keeping those opacities unchanging during the period of flash exposure.

4. The method of claim 1, wherein application of the mask pattern to the head includes varying opacity of the filters between respective maximum and minimum states over time during light exposure, and further comprising adjusting time in which the filters remain in the state of minimum opacity to affect modulation of light output.

5. The method of claim 1, further comprising continuously varying opacity of the filters over time during a flash exposure period.

6. The method of claim 1, wherein the orientation data includes yaw, pitch, and roll data.

7. The method of claim 1, further comprising the mask creating a gradient for the exposure frame, including minimizing the differences in illumination among subjects of varying distances from the flash.

8. The method of claim 1, wherein each filter is separately addressable, and the mask creation including independently adjusting opacity of the filters in the array to vary intensity of light reaching various regions of the exposure composition.

9. A computer program product for flash photography, the computer program product comprising a computer readable storage medium having program code embodied therewith, the program code executable by a processor to:
    analyze a photographic composition, including metering composition subjects and determining flash illumination required for the composition subjects;
    create a mask from an array of filters for application of the metered composition, including collecting distance information for the composition subjects and combining the collected information with orientation data, and calculating a pattern of the filters for modulating output of an electronic flash;
    apply the created mask pattern to a head of the flash; and
    make an exposure of the composition with the masked device.

10. The computer program product of claim 9 further comprising program code to balance exposure of multiple subjects in the composition by selectively illuminating the subjects in the composition by varying light intensity across an exposure frame.

11. The computer program product of claim 9, wherein application of the mask pattern to the flash head includes code to continuously vary opacity of the filters in transparency at various matrix locations across the head of the flash for spatial distribution over a coordinate plane to vary extent to which light is allowed to pass through the filters.

12. The computer program product of claim 9, wherein application of the mask pattern to the flash head includes code to vary opacity of the filters between respective maximum and minimum states over time during light exposure, and further comprising code to adjust time in which the filters remain in the state of minimum opacity to affect modulation of flash light output.

13. The computer program product of claim 9, further comprising code to continuously vary transparency of the filter over time during a flash exposure period.

14. The computer program product of claim 9, wherein the the orientation data includes yaw, pitch, and roll data.

15. The computer program product of claim 9, further comprising program code for the mask to create a gradient for the exposure frame, including program code to minimize differences in illumination among subjects of varying distance from the flash.

16. The computer program product of claim 9, wherein each filter is separately addressable, and the mask creation includes program code to adjust opacity of the filters in the array to vary intensity of light reaching various regions of the exposure composition.

17. A camera unit comprising:
  a processing unit operatively coupled to memory and an electronic flash;
  tools in communication with the processing unit to adjust illumination from the device to an associated composition, the tools comprising:
    an application to analyze a composition for a photograph, including the application to meter composition subjects and determine flash illumination required for the composition subjects;
    a modifier in communication with the application, the modifier to create a mask from an array of filters for application of the analyzed composition, including collecting distance information for the composition subjects and combining the collected information with orientation data, and calculating a pattern of the filters for modulating output of the flash;
    the application to apply the created mask pattern to the flash; and
    the application to make an exposure of the composition with the masked flash.

18. The camera of claim 17, further comprising the application to balance exposure of multiple subjects in the composition by selectively illuminating the subjects in the composition by varying light intensity across an exposure frame.

19. The camera of claim 17, wherein application of the mask pattern to the flash head includes varying opacity of the filters in transparency at various matrix locations across the head of the flash for spatial distribution over a coordinate plane to vary extent to which light is allowed to pass through the filters.

20. The camera of claim 17, further comprising the mask to create a gradient for the exposure frame, including minimize differences in illumination among subjects of varying distance from the device.

21. The camera of claim 17, further comprising the application to continuously vary opacity of the filters over time during a flash exposure period.

22. The camera of claim 17, wherein each filter is separately addressable, and the mask creation includes program code to adjust opacity of the filters in the array to vary intensity of light reaching various regions of the exposure composition.

* * * * *